US010036211B2

(12) United States Patent
Sullivan et al.

(10) Patent No.: US 10,036,211 B2
(45) Date of Patent: Jul. 31, 2018

(54) TORQUE LIMITING DEVICE

(71) Applicant: Weatherford UK Limited, Great Yarmouth (GB)

(72) Inventors: Michael Keith Sullivan, Katy, TX (US); Shane Paul Hart, Cypress, TX (US); Mark Christopher Glaser, Houston, TX (US); Ruairidh Cooper, Banchory (GB)

(73) Assignee: WEATHERFORD UK LIMITED (GB)

( * ) Notice: Subject to any disclaimer, the term of this patent is extended or adjusted under 35 U.S.C. 154(b) by 0 days.

(21) Appl. No.: 15/270,297

(22) Filed: Sep. 20, 2016

(65) Prior Publication Data
US 2017/0009534 A1 Jan. 12, 2017

Related U.S. Application Data

(62) Division of application No. 13/686,564, filed on Nov. 27, 2012, now Pat. No. 9,453,374.

(30) Foreign Application Priority Data

Nov. 28, 2011 (GB) .................................. 1120476.5

(51) Int. Cl.
*E21B 17/02* (2006.01)
*E21B 17/06* (2006.01)
(Continued)

(52) U.S. Cl.
CPC ............ *E21B 17/021* (2013.01); *E21B 17/06* (2013.01); *E21B 34/06* (2013.01); *E21B 37/00* (2013.01)

(58) Field of Classification Search
CPC .......... E21B 17/06; E21B 37/02; E21B 17/04; E21B 17/02; E21B 17/021; E21B 17/073; E21B 17/1064; E21B 37/00
See application file for complete search history.

(56) References Cited

U.S. PATENT DOCUMENTS 3,727,948 A 4/1973 Current
3,800,546 A 4/1974 Holken et al.
(Continued)

FOREIGN PATENT DOCUMENTS

EP 1 214 501 B1 4/2005
GB 2 346 401 A 8/2000
(Continued)

OTHER PUBLICATIONS

Weatherford; Generic BHA for: Washing over screens, Milling Over Packers, Washing over Tubulars.
(Continued)

*Primary Examiner* — Daniel P Stephenson
(74) *Attorney, Agent, or Firm* — Patterson & Sheridan, L.L.P.

(57) ABSTRACT

A work string assembly for an oil or gas well has a first and second tubulars, and a torque limiting device connected in the work string. The torque limiting device has a body with an axial bore and two interconnected members that can disconnect to be relatively rotatable. The interconnected members can be repeatedly re-engageable when the torque levels drop below a torque threshold value, or can be connected by a frangible member that is broken when the interconnected members disconnect. A selectively actuable circulation port provided in the string adjacent to and above the torque limiting device allows the annulus between the work string and the casing to be flushed with fluid from the port.

17 Claims, 8 Drawing Sheets

(51) Int. Cl.
*E21B 34/06* (2006.01)
*E21B 37/00* (2006.01)

(56) References Cited

U.S. PATENT DOCUMENTS

| | | |
|---|---|---|
| 3,957,114 A | 5/1976 | Streich |
| 4,064,953 A | 12/1977 | Collins |
| 4,611,662 A | 9/1986 | Harrington |
| 4,698,631 A | 10/1987 | Kelly, Jr. et al. |
| 5,129,454 A | 7/1992 | Telfer |
| 5,142,128 A | 8/1992 | Perkin et al. |
| 5,289,372 A | 2/1994 | Guthrie et al. |
| 5,323,852 A | 6/1994 | Cornette et al. |
| 5,360,967 A | 11/1994 | Perkin et al. |
| 5,975,208 A | 11/1999 | Brooks |
| 5,991,602 A | 11/1999 | Sturm |
| 6,333,699 B1 | 12/2001 | Zierolf |
| 6,333,700 B1 | 12/2001 | Thomeer et al. |
| 6,343,649 B1 | 2/2002 | Beck et al. |
| 6,347,292 B1 | 2/2002 | Denny et al. |
| 6,359,569 B2 | 3/2002 | Beck et al. |
| 6,443,228 B1 | 9/2002 | Aronstam et al. |
| 6,480,811 B2 | 11/2002 | Denny et al. |
| 6,481,505 B2 | 11/2002 | Beck et al. |
| 6,497,280 B2 | 12/2002 | Beck et al. |
| 6,497,295 B1 | 12/2002 | Carmichael et al. |
| 6,536,524 B1 | 3/2003 | Snider |
| 6,588,505 B2 | 7/2003 | Beck et al. |
| 6,597,175 B1 | 7/2003 | Brisco |
| 6,604,063 B2 | 8/2003 | Denny et al. |
| 6,745,833 B2 | 6/2004 | Aronstam et al. |
| 6,759,968 B2 | 7/2004 | Zierolf |
| 6,776,240 B2 | 8/2004 | Kenison et al. |
| 6,789,619 B2 | 9/2004 | Carlson et al. |
| 6,802,373 B2 | 10/2004 | Dillenbeck et al. |
| 6,851,472 B2 * | 2/2005 | Hern ............... E21B 17/046 15/104.05 |
| 6,915,848 B2 | 7/2005 | Thomeer et al. |
| 6,935,425 B2 | 8/2005 | Aronstam |
| 6,973,416 B2 | 12/2005 | Denny et al. |
| 6,976,535 B2 | 12/2005 | Aronstam et al. |
| 6,989,764 B2 | 1/2006 | Thomeer et al. |
| 7,014,100 B2 | 3/2006 | Zierolf |
| 7,062,413 B2 | 6/2006 | Denny et al. |
| 7,063,148 B2 | 6/2006 | Jabusch |
| 7,066,256 B2 | 6/2006 | Dillenbeck et al. |
| 7,084,769 B2 | 8/2006 | Bauer et al. |
| 7,128,154 B2 | 10/2006 | Giroux et al. |
| 7,159,654 B2 | 1/2007 | Ellison et al. |
| 7,252,152 B2 | 8/2007 | LoGiudice et al. |
| 7,273,102 B2 | 9/2007 | Sheffield |
| 7,275,602 B2 | 10/2007 | Green et al. |
| 7,283,061 B1 | 10/2007 | Snider et al. |
| 7,296,462 B2 | 11/2007 | Gregory et al. |
| 7,385,523 B2 | 6/2008 | Thomeer et al. |
| 7,389,205 B2 | 6/2008 | Denny et al. |
| 7,400,263 B2 | 7/2008 | Snider et al. |
| 7,455,108 B2 | 11/2008 | Jenkins et al. |
| 7,484,625 B2 | 2/2009 | Scott et al. |
| 7,500,389 B2 | 3/2009 | Green et al. |
| 7,503,398 B2 | 3/2009 | LoGiudice et al. |
| 7,543,637 B2 | 6/2009 | Green et al. |
| 7,591,318 B2 | 9/2009 | Tilghman |
| 7,606,682 B2 | 10/2009 | Denny et al. |
| 7,634,942 B2 | 12/2009 | Green et al. |
| 7,714,741 B2 | 5/2010 | Snider et al. |
| 7,836,947 B2 | 11/2010 | Booth |
| 7,912,678 B2 | 3/2011 | Denny et al. |
| 7,946,356 B2 | 5/2011 | Koederitz et al. |
| 7,958,715 B2 | 6/2011 | Kinert et al. |
| 7,963,452 B2 | 6/2011 | Moritz |
| 8,016,037 B2 | 9/2011 | Bloom et al. |
| 9,453,374 B2 * | 9/2016 | Sullivan ............... E21B 17/021 |
| 2001/0000202 A1 | 4/2001 | Tibbitts |
| 2001/0022223 A1 | 9/2001 | Howlett |
| 2003/0029611 A1 | 2/2003 | Owens |
| 2003/0174099 A1 | 9/2003 | Bauer et al. |
| 2004/0239521 A1 | 12/2004 | Zierolf |
| 2005/0230109 A1 | 10/2005 | Kammann et al. |
| 2006/0087448 A1 | 4/2006 | Den Boer et al. |
| 2006/0124310 A1 | 6/2006 | Lopez de Cardenas et al. |
| 2006/0175404 A1 | 8/2006 | Zierolf |
| 2007/0124220 A1 | 5/2007 | Griggs et al. |
| 2007/0267221 A1 | 11/2007 | Giroux et al. |
| 2007/0272411 A1 | 11/2007 | Lopez de Cardenas et al. |
| 2007/0285275 A1 | 12/2007 | Purkis et al. |
| 2008/0000690 A1 | 1/2008 | Lynde |
| 2008/0041597 A1 | 2/2008 | Fisher et al. |
| 2008/0105427 A1 | 5/2008 | Hampton et al. |
| 2008/0128126 A1 | 6/2008 | Dagenais et al. |
| 2008/0128168 A1 | 6/2008 | Purkis et al. |
| 2008/0245534 A1 | 10/2008 | Purkis |
| 2008/0271887 A1 | 11/2008 | Snider et al. |
| 2009/0044937 A1 | 2/2009 | Purkis |
| 2009/0065214 A1 | 3/2009 | Purkis |
| 2009/0090502 A1 | 4/2009 | Lumbye et al. |
| 2009/0114401 A1 | 5/2009 | Purkis |
| 2009/0121895 A1 | 5/2009 | Denny et al. |
| 2009/0151939 A1 | 6/2009 | Bailey et al. |
| 2009/0208295 A1 | 8/2009 | Kinert et al. |
| 2009/0223663 A1 | 9/2009 | Snider et al. |
| 2009/0223670 A1 | 9/2009 | Snider |
| 2009/0230340 A1 | 9/2009 | Purkis |
| 2009/0266544 A1 | 10/2009 | Redlinger et al. |
| 2009/0272544 A1 | 11/2009 | Giroux et al. |
| 2009/0283454 A1 | 11/2009 | Scott et al. |
| 2010/0089583 A1 | 4/2010 | Xu et al. |
| 2010/0170681 A1 | 7/2010 | Purkis |
| 2010/0200243 A1 | 8/2010 | Purkis |
| 2010/0200244 A1 | 8/2010 | Purkis |
| 2010/0288502 A1 | 11/2010 | Stokka et al. |
| 2011/0148603 A1 | 6/2011 | Denny et al. |
| 2011/0204143 A1 | 8/2011 | Mackenzie et al. |
| 2011/0240313 A1 | 10/2011 | Knobloch, Jr. et al. |
| 2011/0248566 A1 | 10/2011 | Purkis |
| 2012/0152521 A1 | 6/2012 | Akkerman et al. |
| 2013/0140029 A1 | 6/2013 | Sullivan et al. |
| 2015/0136388 A1 | 5/2015 | Fehr |

FOREIGN PATENT DOCUMENTS

| | | |
|---|---|---|
| GB | 2 359 105 A | 8/2001 |
| GB | 2 381 806 A | 5/2003 |
| WO | 92/05533 A1 | 4/1992 |
| WO | 00/73625 A1 | 12/2000 |
| WO | 01/49967 A1 | 7/2001 |
| WO | 2006/046075 A2 | 5/2006 |
| WO | 2006/051250 A1 | 5/2006 |
| WO | 2006/046075 A3 | 7/2006 |
| WO | 2006/082407 A1 | 8/2006 |
| WO | 2006/082421 A1 | 8/2006 |
| WO | 2006/109008 A1 | 10/2006 |
| WO | 2006/120466 A2 | 11/2006 |
| WO | 2006/120466 A3 | 1/2007 |
| WO | 2007/125335 A1 | 11/2007 |
| WO | 2008/059260 A2 | 5/2008 |
| WO | 2008/059260 A3 | 7/2008 |
| WO | 2009/050517 A2 | 4/2009 |
| WO | 2009/050518 A2 | 4/2009 |
| WO | 2009/098512 A2 | 8/2009 |
| WO | 2009/109788 A1 | 9/2009 |
| WO | 2009/114356 A1 | 9/2009 |
| WO | 2009/050517 A3 | 1/2010 |
| WO | 2006/051250 A8 | 3/2010 |
| WO | 2009/050518 A3 | 4/2010 |
| WO | 2010/038072 A1 | 4/2010 |
| WO | 2010/086654 A1 | 8/2010 |
| WO | 2010/149643 A1 | 12/2010 |
| WO | 2010/149644 A1 | 12/2010 |

(56) References Cited

OTHER PUBLICATIONS

Drilling Well Technology: RFID Technology for Downhole Well Applications; Authors: Fraley, Karen and Snider, Phil; © Touch Briefings 2007.
Company News; Contracts and Tenders; M-I Swaco; JPT—May 2008.
American Association of Drilling Engineers; AADE 2009NTCE-16-04: RFID Downhole Tools and Development for the Drilling Environment; Snider, Philip; Clarke, Ron; Moody, Mike; and Laws, Graeme; pp. 1-3; 2009NTCE-16-04 Tech Paper.
Petrowell Operations Report; Petroweel Ltd.; Petrowell RFID Circulation Sub First Deployment for CNR International Aug. 2005; Runge, Paul.
Weatherford Drilling & Intervention Services; Fishing BHAs without torque limiting sub.
Weatherford Fishing Technology Best Practices Manual; Section 7; Fishing for Parted Pipe; Weatherford Copyright 2002.
Great Britain Search Report; Application No. GB1120476.5; dated Mar. 7, 2012.
Great Britain Search Report; Application No. GB1120476.5; dated Jun. 12, 2012.
Great Britain Search Report; Application No. GB12213960.6; dated Mar. 8, 2012.
Great Britain Search Report; Application No. GB1120476.5; dated Jun. 12, 2013.
Wellbore Energy Solutions, LLC; Clean Well TurboDrive.
Weatherford Drilling & Intervention Services; Washover Stuck Pipe.
Foreign Search Report; Application No. GB1221390.6; dated Jul. 22, 2013.
Interference Judgment; United States Patent and Trademark Office; Before the Board of Patent Appeals and Interferences; *Hubertus V. Thomeer and Sarmad Adnan, Junior Party* (U.S. Pat No. 6,333,700), v. *Philip M. Snider and Joseph A. Zierolf, Senior Party* (U.S. Appl. No. 09/586,648); Patent Interference No. 105,466 (SCM) (Technology Center 2600); Nov. 21, 2006.

\* cited by examiner

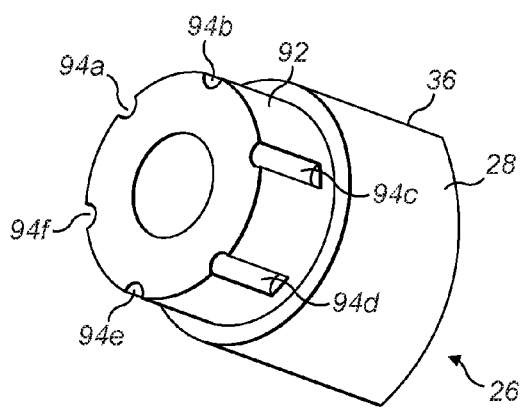
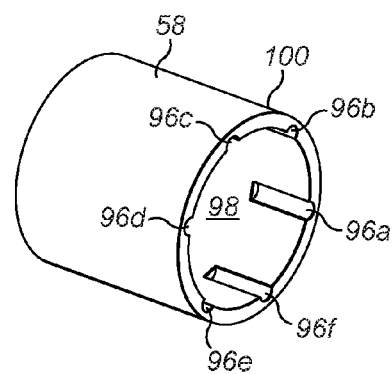
FIG. 6(a)    FIG. 6(b)
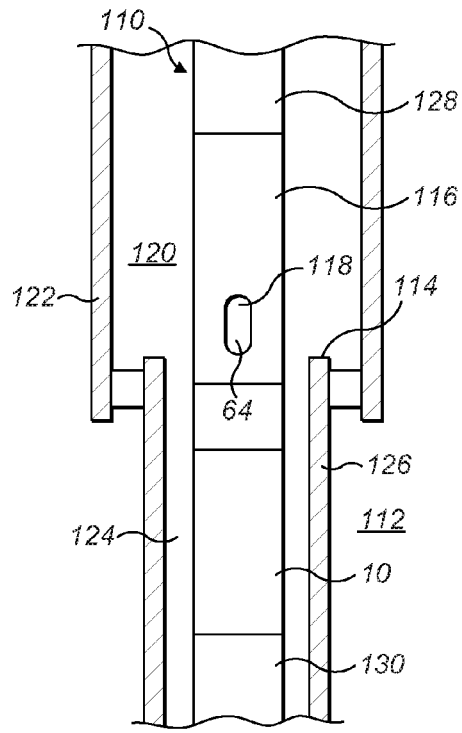
FIG. 7

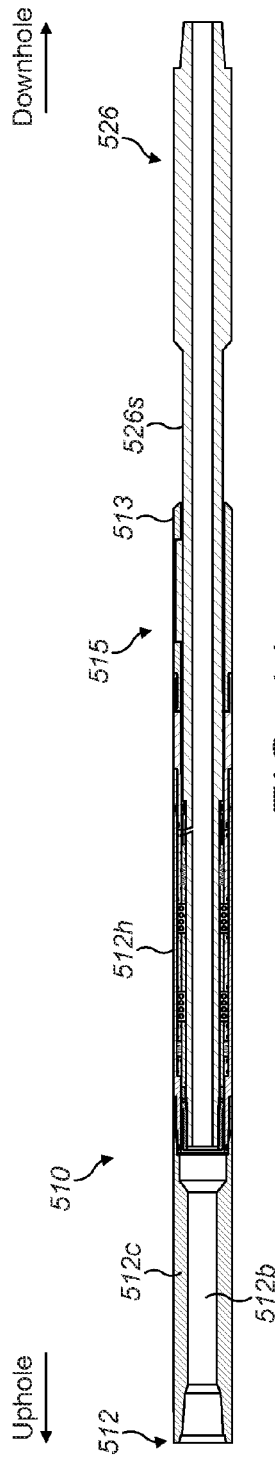
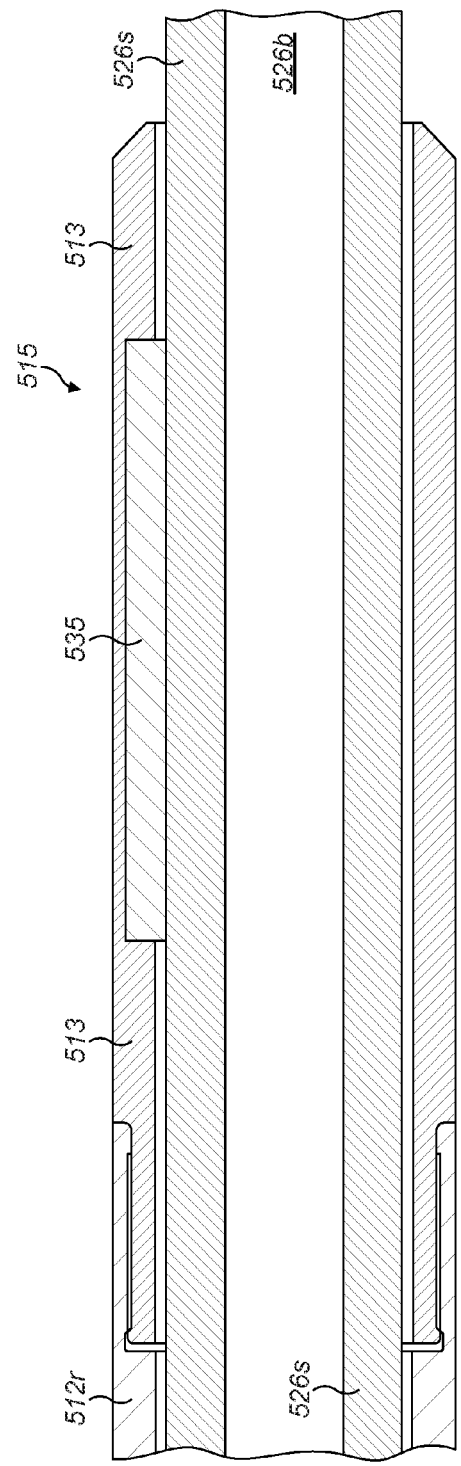
FIG. 11
FIG. 12

TORQUE LIMITING DEVICE

BACKGROUND OF THE INVENTION

Field of the Invention

The present invention relates to downhole tools and particularly, though not exclusively, to a torque limiting device used to allow relative rotation between two tubulars when a predetermined torque is applied between the tubulars, thereby reducing or preventing torsional damage to the tubulars or the connection between them at torque loads above the threshold of the predetermined torque.

Description of the Related Art

Wellbores typically contain various strings of tubulars connected end to end in the well. From time to time, for example, after drilling and casing a well, the inner surface of a tubular string such as a casing string is conveniently cleaned with a cleaning string to remove rust and other debris from the well bore. When a cleaning string is rotated by the powerful rig top drive to scrub the inner surface of the casing string, an operator must be careful to avoid applying too much torque to the cleaning string because it is common for high torque levels that can be applied by the top drive to damage the cleaning string, requiring costly intervention to repair or recover the damaged string.

The actual torque applied to each part of the string can be affected by the properties of the work string itself and by the properties of fluid that locally surround that part. Additional problems can arise in well bore cleaning operations because of the practice of circulating different cleaning fluids such as brine through the string at the bottom of the well in order to displace drilling mud or other lubricant from the annular space between the casing string and the cleaning string. As a result, different parts of the string can be surrounded locally by different fluids, and as a result, the two parts can be exposed to different frictional forces that resist the string's rotation to different extents. For example, strings rotating in brine have approximately twice the drag as compared with those run in mud and the method of pumping the brine down through the inner work string out through an aperture at the bottom of the work string and then up the annulus outside the work string to displace the mud ahead of it means that the lowermost section of a work string that is being used to pump brine may be rotating in brine whereas the uppermost might be rotating in low friction drilling mud. Such a string will therefore experience differential drag along its length. Accordingly, the torque experienced by the lower section of the work string can be different from the torque experienced at the upper section. The moving interface between the brine and the drilling mud as the mud is displaced upwards along the annulus results in additional complications for the operator, and the risks of exceeding the mechanical properties of the lower string are increased as there is no mechanism to monitor from the surface the torque that is experienced by the lower section of cleaning string in these variable conditions.

Furthermore tubular strings are often arranged in sequential sections of gradually decreasing diameter, and adjacent sections of tubular typically create steps in the diameter of the string, for example, in a work string, an upper section can often have a larger outer diameter than a lower section. Also, a casing string can have steps in the inner diameter, for example where a liner is hung inside casing. Difficulties arise in satisfactory removal of debris from e.g. casing strings with a non-uniform inner diameter because there is frequently a large annular space between some portions of the work string bearing cleaning tools and the upper sections of the casing string being cleaned. Cleaning strings used to carry out this cleaning task are therefore typically made up with at least two sequential sections of decreasing diameter so that the larger diameter upper sections of casing string are cleaned by a larger diameter section of the work string. Accordingly the cleaning string can typically have at least one step (or crossover) in its diameter and the relative mechanical properties of upper and lower sections of the cleaning string can therefore be very different. This increases the risks of torsional damage to the crossover or the weaker narrow diameter pipe below it.

In a well with 4 to 5,000 feet of liner, when the brine is circulated to the top of the liner, the rotating tubular string will experience an increase in torque as described above. To avoid damage to the lower string typically a circulation tool with a clutch device is located in the string and positioned at the liner top. The clutch device allows the lower string to be selectively mechanically disengaged from the upper string. While the clutch is engaged, rotation of the upper string is transmitted across the clutch and the upper and lower strings rotate together, but when the clutch is disengaged, the upper string can freely rotate while the lower string remains stationary. The circulation tool and clutch tend to be interdependent or even incorporated into a single tool. When the circulating brine reaches the liner top, the clutch is engaged and the circulation tool is activated to increase the pump rate of brine into the wider casing. However, when the circulation tool is ready to be activated and the clutch engaged, the relatively narrow liner annulus is already full of brine and maximum torque is already applied to the narrow section of the cleaning string below the circulation tool. Currently, in an attempt to prevent damage to the string from the torque, an operator will stop rotation of the string early. This compromises cleaning of the liner as mud may be left at the liner top. Alternatively if rotation is not stopped sufficiently early the lower string and/or the crossover may be damaged by the torque.

SUMMARY OF THE INVENTION

The invention provides a torque limiting apparatus for a work string of an oil or gas well, the torque limiting device comprising a body having an axial bore therethrough for fluid flow; the body comprising a first member and a second member interconnected to be relatively rotatable; the first and second members being interconnected by a torque limiting device adapted to transfer torque between the first and second members up to a threshold torque value, thereby rotationally coupling the first and second members together at torque levels below the threshold torque value, and wherein the torque limiting device is adapted to disengage the connection between the first and second members when torque applied across the body is greater than the threshold torque value, whereby after disengagement of the torque limiting member at least a portion of the first member can rotate relative to at least a portion of the second member.

The invention also provides a work string assembly for use in an oil or gas well, the work string having a first tubular and a second tubular, and a torque limiting apparatus as defined above connected in the string.

The invention also provides a method of treating wellbore in an oil or gas well, where the wellbore has an upper portion and a lower portion, the method comprising inserting a work string assembly into the wellbore being treated, the work string assembly having upper and lower portions of the work string, and at least one torque limiting apparatus; and wherein the method includes the step of injecting fluids through the work string assembly to displace fluids in the wellbore and allowing relative movement of the upper and lower portions of the work string assembly when the torque between the upper and lower portions of the work string assembly exceeds a threshold torque value.

According to one embodiment of the present invention there is provided a work string assembly for use in an oil or gas well, the work string having a first tubular and a second tubular, with a torque limiting device connected in the work string, the torque limiting device comprising a substantially cylindrical body having an axial bore therethrough for fluid flow; the body comprising a first member and a second member interconnected to be relatively rotatable; the first member including a first surface having at least one recess thereupon; the second member having at least one movable protrusion, each protrusion being biased by a resilient device and being movably arranged in the second member such that the resilient device biases the protrusion into the recess on the first member to cause the first and second members to rotate together; and wherein the recess and the protrusion have slidably engageable surfaces such that when a torque applied across the body is greater than a preset load of the resilient device, the protrusion will disengage from the recess and at least a portion of the first member will rotate relative to at least a portion of the second member.

Typically the torque limiting device is connected in the work string between the two tubulars, but in some embodiments the torque limiting device can be provided in one of the tubulars and can be spaced away from the connection between the two tubulars, either above the connection or (typically) below the connection between the two tubulars.

Typically the work string has a selectively actuable circulation port provided in the string adjacent to and above the torque limiting device, whereby when the work string assembly is located in use in a borehole, opening of the port allows the annulus between the work string and the casing to be flushed with fluid from the port.

Optionally the protrusion can comprise a piston. Optionally the device can have an axis, and the protrusion can move axially parallel to the axis.

In some embodiments the device can be used in a string with a crossover or step in the diameter, but it is equally useful in a string of consistent diameter along its length.

The device can be run on a rotating string with fluid flow therethrough. When torque is applied to the string, the device can disengage at a preset load and the first and second tubulars can freely rotate relative to each other. Additionally, when the applied torque drops below the preset load, the device can re-engage and the first and second tubulars can again rotate as a single unit. Thus the device can reset downhole, typically allowing repeated engagement and disengagement without intervention.

In some embodiments, the device can be arranged to disengage at a preset load, and then stay in that disengaged configuration, without re-engaging after the torque drops below the preset load.

Optionally, there are a plurality of protrusions and a matching plurality of recesses. This can spread the load between the members and provide a smoother engagement and disengagement of the tool.

Optionally the slidably engageable surfaces are rounded. Optionally the surface of the recess substantially matches the surface of the protrusion with which it engages. The surfaces may be part spherical. In this way a ball fitting can be used at an end of the protrusion.

Optionally the resilient device can be a spring, such as a mechanical spring, or alternatively a gas spring. Optionally the protrusion and the resilient device are retained in a housing, and are typically arranged to move axially with respect to the second tubular member. Arranging the protrusion and the resilient device together in a housing helps them to work in unison. By arranging the housing and the resilient device axially with respect to the second tubular member, the protrusions can be constrained to move only axially with respect to the second member and thus they can operate in a cam action to engage and disengage from the recess(es) when rotated relative thereto. Also, the resilient device (e.g. a spring) can be set in a long axial cavity and can be selected to have a suitable spring rate to apply a high force with little axial movement of the protrusion.

In some embodiments of the device the protrusion and resilient device can be arranged radially rather than axially.

Optionally a sleeve is arranged over the housing. In this way, the piston and recess can be sealed off from the outside of the device.

Optionally, the resilient device comprises a spring, typically a disc spring or a stack of such springs. Optionally there is a plurality of disc springs. By using disc springs the travel required to move between engaged and disengaged configurations is kept small. The number and rating of the springs can be is selected to determine the torque at which the device will disengage.

Optionally a stack of disc springs such as Bellville washers can be arranged in a cylindrical bore through the housing, which can optionally be arranged to be parallel to and in alignment with the axis of the throughbore of the device.

According to another embodiment, the invention also provides a torque limiting device for use in a work string for an oil and gas well, the torque limiting device comprising a body having an axial bore therethrough for fluid flow; the body comprising a first member and a second member interconnected to be relatively rotatable; the first and second members being interconnected by a frangible member adapted to transfer torque between the first and second members up to a threshold torque value, thereby rotationally coupling the first and second members together at torque levels below the threshold torque value, and wherein the frangible member is adapted to break when torque applied across the body is greater than the threshold torque value, whereby after breaking of the frangible member at least a portion of the first member can rotate relative to at least a portion of the second member.

Optionally the torque can be transferred through the frangible element, which can optionally comprise a pin or plate that is adapted to resist relative rotation between two parts (e.g. two ends) of the torque limiting device below a determinable torque threshold, but to shear or otherwise break above the determinable torque threshold, thereby allowing relative rotation between the two part of the torque limiting device. Optionally more than one frangible element can be provided, e.g. 2, 3, 4 or more. The threshold torque value can be determined by the material of the element, the thickness of the element, the length of the element, and the number of the elements.

Typically the frangible element is an elongate member that is arranged parallel to the axis of rotation of the first and second members, for example in the form of an elongate plate. Providing the frangible element in this form can optionally increase the surface area of the frangible element that is engaged with each of the first and second members, which can optionally be engaged along the elongate sides of the plate, providing a larger bearing area for transmission of forces through the frangible element, and thereby reducing the risk of premature shearing of the frangible element. Also, the provision of the frangible element in an elongate form reduces the tendency of the material of the frangible element to undergo surface and other damage such as brinelling.

Optionally the two parts of the torque limiting device can be provided with bearings to reduce friction during relative rotation of the two parts. Optionally the bearings can be lubricated by fluids passing through the device, which can optionally incorporate fluid pathways to guide a proportion of the fluid conducted through the torque limiting device through the fluid pathways to lubricate the bearings.

Optionally a resilient device can be provided to apply a compressive force between the two parts of the torque limiting device. Typically the bearings can be preloaded by the resilient device.

Optionally a bearing is located between the first and second tubular members. This typically provides smooth rotation of the members relative to each other. In one embodiment the bearing is located between the sleeve and one of the tubular members, the sleeve typically being connected to the other member.

Typically the first and second tubulars can have different mechanical properties. In one embodiment of the invention, the first (upper) tubular can be stronger and more resistant to torque than the second (lower) tubular.

Typically the work string can be a tapered string. For example, the first and second tubulars can be of different sizes, e.g. of different diameters. In one embodiment of the invention, the first (upper) tubular can have a larger diameter than the second (lower) tubular. The difference in diameter can typically result in a difference in mechanical properties. In some embodiments the two tubulars can be of substantially the same outer diameter, and the work string can be provided with a substantially consistent outer diameter across the torque dislocation device.

In certain embodiments of the invention, the upper tubular can have a smaller diameter than the lower tubular.

Optionally the casing being treated with the work string can have a step in its inner diameter, although the work string is optionally useful for treating casing that has a substantially consistent inner diameter.

According to a further embodiment, the present invention also provides a method of treating a liner portion located in a well bore, comprising the steps:
 (a) locating a torque limiting device in a work string;
 (b) running the work string in the well while rotating the string and the torque limiting device;
 (c) circulating a fluid through the string and up an annulus between the string and the liner to the liner portion to be treated
 (d) allowing the torque limiting device to disengage under the applied torque in the liner; and
 (e) passing fluid through the casing at the liner portion.

The liner portion can optionally be the top of the liner.

In some embodiments, the work string can optionally incorporate a circulation tool, although this is not necessary in all embodiments. The circulation tool if present is typically located in the region of the liner portion to be treated, optionally above the torque limiting device, and typically being opened to pass fluid from the bore of the work string though the circulation tool and into the annulus between the string and the liner.

In this way, the treatment fluid, e.g. the cleaning fluid can reach e.g. the liner top before the fluid is pumped through the circulation tool, providing for efficient cleaning of the liner top.

The method typically includes cleaning or washing of the wellbore.

The wellbore can optionally be cased.

Optionally the method further comprises the step of re-engaging the torque limiting device. In this way the circulation tool can typically be moved easily to operate at another location in the well while rotating the tool string.

According to a further embodiment of the invention there is provided a method of treating a wellbore in an oil or gas well, where the wellbore has an upper portion and a lower portion with a connection between them, the method comprising inserting a work string into the wellbore being treated, the work string having upper and lower portions, and a torque dislocation device connected in the work string; and wherein the method includes the step of injecting fluids through the work string to displace fluids in the wellbore and allowing relative movement of the upper and lower portions of the work string when the torque between the upper and lower portions of the work string exceeds a predetermined threshold.

Typically the torque dislocation device allows relative rotation of the upper and lower portions of the work string when the torque between the upper and lower portions of the work string exceeds a predetermined threshold.

Typically the upper portion of the wellbore has a larger inner diameter than the lower portion.

Typically the method includes landing the torque dislocation device in the region of the connection between the upper and lower portions of the wellbore being treated.

Typically the work string can have cleaning tools such as brushes and/or scrapers provided in the work string, typically below the torque dislocation device, and typically spaced above the bottom of the string. Typically other wellbore cleaning tools e.g. brushes and scrapers etc can also be provided above the torque limiting device adjacent to the casing above the liner.

Typically the work string can have a circulation port located in the work string, optionally above the torque dislocation device.

Typically the work string can have a filter device.

Typically the work string can have a junk catcher device.

Typically the work string can comprise a fishing tool and can be used in a fishing operation to recover dropped or lost items or "fish" from the wellbore. Optionally the fishing tool can include a milling tool to cut the fish typically by a rotary action applied through rotation of the work string, in order to facilitate recovery of the fish. The milling tool can be a packer mill or the like. In certain embodiments, the fishing tool can include a wash pipe or overshot or some other fishing tool that engages the outer diameter of the fish. Alternatively, or additionally, the fishing tool can comprise a spear or tapping tool that engages the inner surface of the fish. The work string can incorporate jarring tools in some embodiments. Any suitable fishing tool or jarring tool can be incorporated into the work string, below the torque limiting device. Suitable fishing and jarring tools are well known in the art and some examples are shown in the Weatherford publication "Fishing Technology Best practices Manual" the disclosure of which is incorporated herein by reference.

The torque limit setting of the torque limiting device is typically set to disengage and allow relative rotation of the components on opposite sides of the torque limiting device before the torque in the work string approaches the limits of the portion of the string below the torque limiting device, typically the wash pipe or other fishing tool, which typically has less resistance to torque than the drill pipe or other tubular above the torque limiting device. Therefore the torque limiting device typically maintains the operating torque of the work string as a whole within the limits of the weakest component in the string, thereby reducing the risks of torque related damage to the weaker components even if torque above the limiting device occasionally rises above the operational limits of the lower string.

Optionally more than one torque limiting device can be incorporated into the string, for example 2, 3, 4 or more torque limiting devices can be incorporated into the string. Optionally the torque limiting devices can be spaced apart from one another in the string, or can be grouped together, or clusters of torque limiting devices can be grouped together (e.g. 2, 3, 4 or more adjacent devices per cluster) while the clusters are spaced apart along the string. Optionally the torque limiting devices can be set to disengage (and thereby allow relative rotation between the string above and below each respective torque limiting devices) at different thresholds of torque. Thus the torque limiting devices set at different parts of the string can be set to disengage at different torque thresholds, so that as the torque experienced by the string increases, different section of the string disengage in a safe manner. Simple embodiments can be constructed with e.g. two torque limiting devices, which are typically set to dislocate at threshold torque values that are different from one another, e.g. one low threshold and one high threshold. Optionally the low threshold device can be located below the high threshold device, and can optionally be located relatively near to the lower end of the string, so that the operator can be relatively confident that the lower torque limiting device can be expected to dislocate at a relatively low torque threshold. Further, the operator can also be reasonably confident that the event of the lower device dislocating will not significantly alter the total torque in the string and so will not significantly affect the configuration of the other, higher threshold torque limiting device at the top of the string.

In some other embodiments incorporating more than one torque limiting device, optionally the torque limiting devices set at different parts of the string can be set to disengage at the same torque threshold, so that once that threshold is reached, spaced apart sections of the string disengage at the same time.

Thus, when using more than one torque limiting device, the threshold torque limits for each device may be set to different values, but in other embodiments using more than one limiting device at different locations within a workstring, the threshold torque limits for each device may be set to the same or similar values.

In embodiments with more than one torque limiting device, the devices can be the same or different. For example, in some such embodiments, one torque limiting device set to rotationally disengage two parts of the string at a particular torque threshold can optionally re-engage the two parts and permit the transfer of torque across the connection when the torque level drops back down below the threshold torque value. This can optionally happen automatically. The string can include other torque limiting devices that are also re-engagable in this manner, optionally automatically. Such strings can also include "one-shot" torque limiting devices that are not re-engagable, and/or that are not automatically re-engagable, and in which, after the torque threshold has been reached and the device has disengaged the two parts of the string, the device cannot automatically reset in situ, so that when the torque level through the connection drops back below the threshold, the device remains disengaged, preventing the transfer of torque across the connection, requiring intervention to re-set the one-shot device(s). Such composite strings including re-engagable and "one-shot" devices can have 1, 2, 3, 4 or more of each kind of torque limiting device, optionally spaced apart from one another in the string, and each can be set to the same or different torque thresholds. The one-shot device(s) can be above or below the re-engagable devices in the string.

The invention also provides an assembly for use in a wellbore, comprising:
a workstring;
an upper torque limiting device comprising:
a first member connected to a second member such that torque applied to the first member below a first threshold torque value is transferred to the second member, wherein torque applied to the first member above the first threshold torque value is not transferred to the second member;
a lower torque limiting device comprising:
a third member connected to a fourth member such that torque applied to the third member below a second threshold torque value is transferred to the fourth member, wherein torque applied to the third member above the second threshold torque value is not transferred to the fourth member.

The first threshold torque value can be substantially equal to the second threshold torque value, or can be different, e.g. typically greater than the second threshold torque value.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6(*a*) is a perspective view of a top end of the second tubular member and FIG. 6(*b*) is a perspective view of the lower end of the housing that receives the top end;

FIG. 7 provides a schematic illustration of a torque limiting device being used in a method of cleaning a liner top according to an embodiment of the present invention;

FIGS. 11, 12, and 13 show side and close up views of a further example of a torque limiting device that can be used in a workstring.

DETAILED DESCRIPTION

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group consisting of", "including", or "is" preceding the recitation of the composition, element or group of elements and vice versa.

All numerical values in this disclosure are understood as being modified by "about". All singular forms of elements, or any other components described herein are understood to include plural forms thereof and vice versa.

Figure 1:
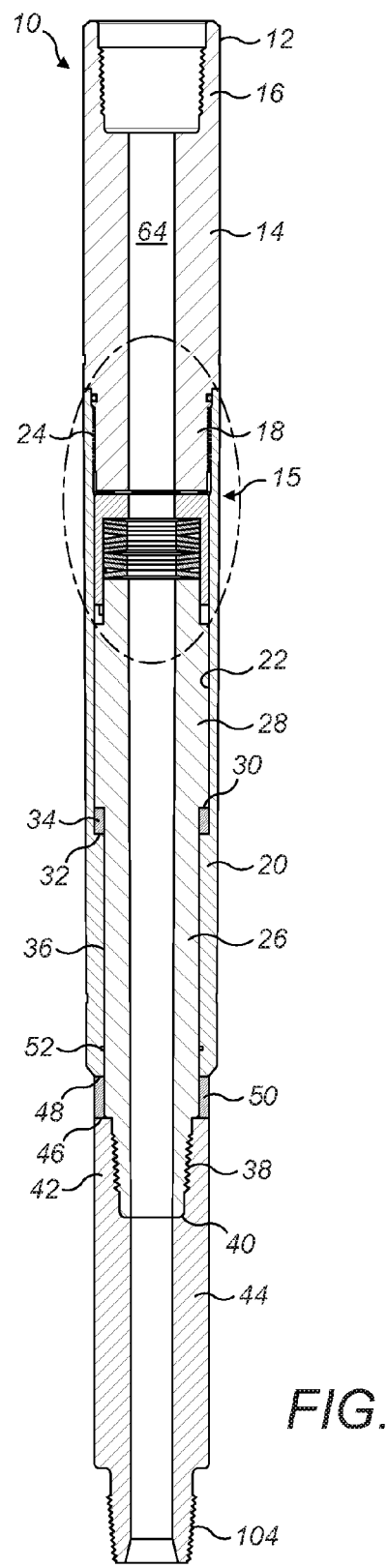
FIG. 1 is a cross sectional view through a torque limiting device according to an embodiment of the present invention.

FIG. 1 of the drawings illustrates a torque limiting device generally indicated by reference numeral 10, according to an embodiment of the present invention. At an upper end 12 there is located a top sub 14 having a box section 16 for connecting a tubular of a tool string to the device 10. A sleeve 20 is fixed around a lower end 18 of the top sub 14 by a screw thread and an o-ring seal is provided between the inner surface 22 of the sleeve 20 and the outer surface 24 of the top sub 14. The sleeve has an inwardly directed upward facing circumferential ledge 32 on the inner surface 22 of the sleeve 20.

Held within the sleeve 20 is a bottom sub 26. The upper end 28 of the bottom sub 26 has an outwardly directed downward facing circumferential ledge 30 that is arranged axially opposite to the ledge 32, so that the upper end 28 of the bottom sub 26 is retained between the lower end 18 of the top sub 14 and the upper surface of the ledge 32. A bearing ring 34 is located within the circumferential chamber formed between the ledges 30,32, the inner surface 22 of the sleeve 20 and the outer surface 36 of the bottom sub 26.

Bottom sub 26 typically terminates in a pin section 38 at a lower end 40. The pin section 38 is connected to a box section 42 of a cross-over sub 44 as is known in the art. The cross-over sub 44 is used to provide an upwardly directed ledge 46 facing a bottom end 48 of the sleeve 20. The ledge 46 and bottom end 48 retain a second bearing ring 50 rotationally mounted on the outer surface 36 of the bottom sub 26. A rotary seal 52 is also located between the first and second bearing rings 34,50 between the inner surface 22 of the sleeve 20 and the outer surface 36 of the bottom sub 26.

The bottom sub 26 is therefore constrained within the sleeve 22, which remains rotationally fixed to the top sub 14 by means of the screw thread. The top sub 14 and bottom sub 26 are rotationally connected together by a torque limiting connection 15 operating between them. The torque limiting connection 15 is provided between the opposing surfaces of the upper sub 14, which is rotationally fixed to the upper part of the string, and the lower sub 26, which is rotationally fixed to the lower part of the string and is rotatable relative to the top sub at high torque loads that dislocate the connection 15.

The torque limiting device 10 of FIG. 1 can typically be incorporated into a cleaning string, having a circulating device above the torque limiting device 10 and a cleaning tool below it. Typically the torque limiting device would be positioned at the lower end of an upper string of drill pipe having a relatively high resistance to torque, typically higher than the cleaning string below the device 10. Positioning the torque limiting device 10 at the top of the lower string has the advantage that the device 10 protects all the connections in the lower string, so that if the torque values applied through the connection between the upper string and the lower string were to momentarily exceed the limits of the lower string then the torque limiting device would disengage to avoid transferring the high torque values above it to the weaker cleaning string below it.

Wellbore cleaning operations are typically carried out in sections of casing that have been cemented in place to provide a secure conduit and to seal off the formation. The cleaning string incorporating the torque limiting device is typically run into the wellbore to clean the inside of the casing, although this embodiment is equally useful for cleaning other well profiles and configurations and the inner surface of the hole can take many different forms including casing, liner and also an open hole section. In a typical embodiment, the cleaning string is deployed to clean a casing and liner configuration having a step in the internal diameter at the top of the liner, which typically requires two different sizes of work string/drill pipe in order to effectively clean the complete wellbore.

In this example, when the well is cased and lined, and the casing and liner are full of drilling mud, the cleaning string is made up at the surface incorporating the torque limiting device and the liner cleaning tools below it and is run into the well, with the appropriate length of small diameter tubular comprising the lower string beneath the torque limiting device, which has been measured before being made up and run into the well. The torque limiting tool 10 is typically installed at the very uppermost end of the lower "skinny" string so that the top end of the torque limiting tool 10 typically connects directly onto the upper string of larger diameter drill pipe or similar. There are typically no "skinny" pipe components above the torque limiting tool in the present embodiment. The upper string above the torque limiting device 10 can typically have a circulation tool or similar and may incorporate further casing cleaning tools adapted to clean the casing above the liner. These are typically made up to the top connection of the torque limiting tool and run into the well. The upper string is then made up using typically drill pipe and the whole assembly is run into the hole to the required depth. At this point the pumps at the surface are typically activated to circulate the well with mud to remove any debris released during the running in phase. The circulation through the work string continues until the mud returns from the well are clean. At that stage, the operator can optionally pump cleaning chemicals such as detergents, scourers etc through the string before pumping completion fluid such as brine. Fluid returns from the well are typically monitored continually during these pumping phases, and quality checks are carried out on completion fluid returning to surface. When the returning completion fluid is of an acceptable quality the pumps are stopped and the assembly is pulled out of the hole. Typically the cleaning tools are visually inspected when they return to surface to look for signs of wear or damage, and the conventional completion operations can then be carried out.

Pipe movement, typically rotation, is useful in effective removal of debris particularly from the lower side of deviated casing and liner. The torque limiting device facilitates maximum benefit in terms of debris removal from the well through maximum rotational pipe movement in the knowledge that the torque limiting tool will activate downhole should the downhole torque become excessive as completion fluid is displaced into the annulus. This mitigates the risk of downhole failure of a drill pipe connection which may result in a costly fishing operation to retrieve the part of the wellbore cleaning assembly and drill pipe left in the well.

During the cleaning operation the string is rotated from the surface drive. The torque limiting device 10 typically operates passively to de-couple the upper and lower strings from one another when the torque passing through the tool exceeds the preset value thus disengaging the lower string. The torque limiting device typically re-engages once the torque levels in the string drop below the limit. Typically the limit is set to de-couple the string at a threshold below the upper limit of the lower "skinny" string so that no torque is transmitted to the lower string above the threshold that it can bear.

During cleaning operations it is only possible to monitor the total torque reading for the complete string from the surface, and is not possible to measure or monitor cumulative torque in real time at any particular point in the string. It is possible however to predict the downhole torque at any point on the string and therefore estimate where and when an excessive torque situation is likely to occur. Whether the tool activates or not on an actual job can be checked by monitoring the total torque reading at the surface. In the event the torque limiting tool activates downhole, the total observable torque at the surface will reduce and this will be manifested by a sudden drop in the surface torque value confirming likely de-coupling of the tool and relative rotation of the upper and lower strings.

Figure 2:
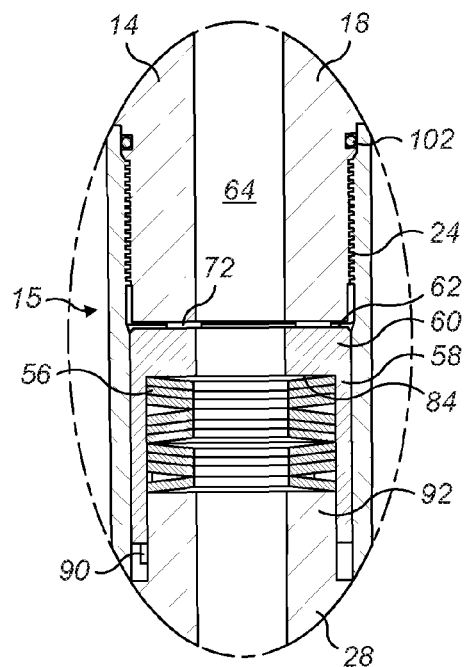
FIG. 2 is an enlarged view of a portion of the device of FIG. 1.

Reference is now made to FIG. 2 of the drawings which shows an enlarged view of the arrangement of elements of the torque limiting connection 15 between the lower end 18 of the top sub 14 and the upper portion 28 of the bottom sub 26. Located at the upper end 28 of the bottom sub 26 is an axial stack of disc springs 56 typically in the form of Bellville washers, with a central bore and an annular ring. The disc springs 56 are typically held in compression in an axial stack between the upper end 28 of the bottom sub 26 and the inner surface of a cylindrical housing 58 that fits over the upper end 28 of the bottom sub 26. Thus the housing 58 is retained on the end 28 of the sub 26 and the spring stack 56 urges it upwards.

Figure 4A:
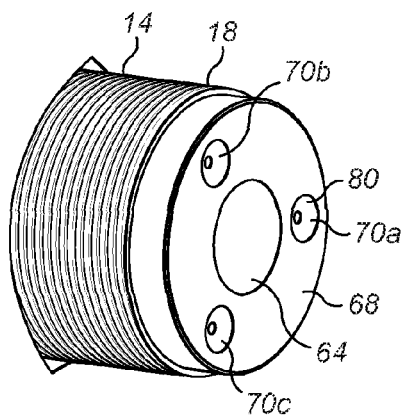
FIG. 4(*a*) is a perspective view of a lower end of a first tubular member of FIG. 1 and FIG. 4(*b*) is a perspective view of the upper end of a housing in which the pistons locate.
Figure 4B:
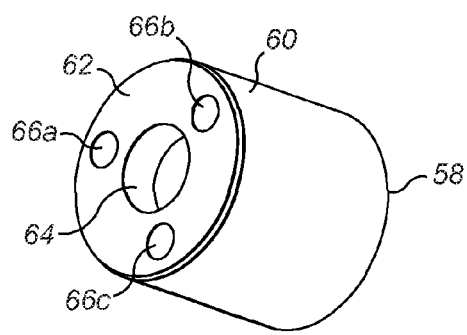

The cylindrical housing 58 typically has an upwardly facing generally flat circular end face 62 at an upper end 60 as best seen in FIG. 4(b). The flat end face 62 has a central axial bore 64 located therethrough, which continues axially through the entire length of the device 10 to provide a fluid passageway through the device 10. The housing 58 has three cylindrical bores 66a-c extending axially parallel to the axis of the housing and the bore 64, and emerging from the flat end face 62. The bores 66 are typically blind bores emerging from the face 62 at locations that are typically equidistantly spaced circumferentially around the bore 64, and can typically be radially spaced approximately mid way between the bore 64 and the edge of the flat end face 62.

In the lower end 18 of the top sub 14, as best illustrated in FIG. 4(a), there is provided a downwardly facing generally flat circular end face 68. The face 68 is recessed at 70a-c at radial and circumferential positions matching the recesses 66a-c on the face 62 of the housing 58. The central bore 64 extends through the top sub 14 and is aligned with the central bore 64 extending through the bottom sub 26, allowing fluid communication through the device 10.

Figure 3:
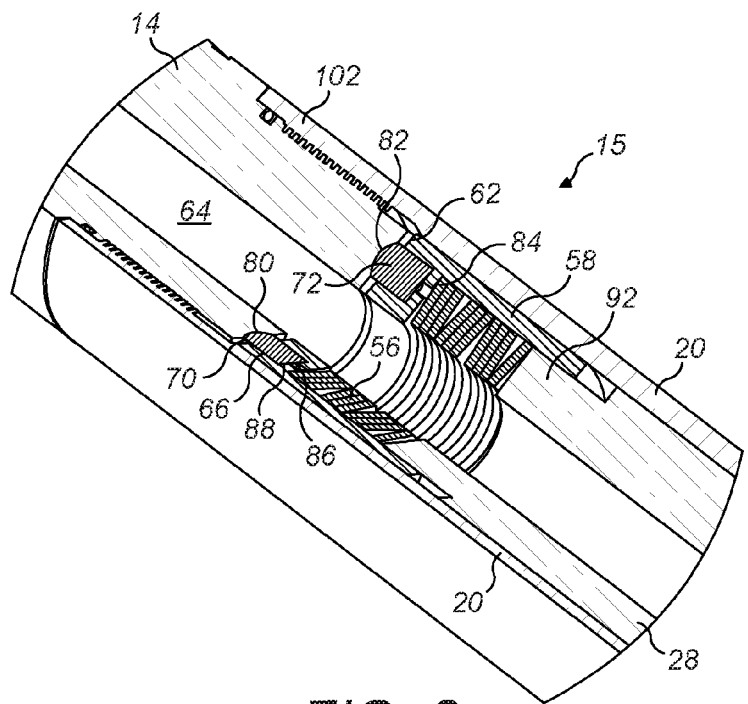
FIG. 3 is part sectional view of the portion of the device of FIG. 2.
Figure 5A:
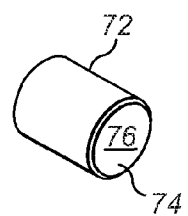
FIGS. 5(*a*) and 5(*b*) are perspective views of a piston for locating in the housing of FIG. 4(*b*) while slidably engaging with the recesses in the first tubular member of FIG. 4(*a*)
Figure 5B:
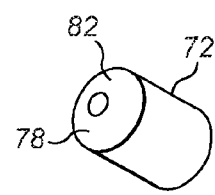

Bores 66a-c extend axially through the housing 58 and are typically sized to retain protrusions in the form of pistons 72 on the upwardly facing end face 62. An embodiment of a piston 72 is illustrated in FIGS. 5(a) and 5(b), and typically has a lower end 74, having a planar face 76, which fits into one of the bores 66 as illustrated in FIG. 3. The upper end 78 of piston 72 typically has a generally hemi-spherical upper face 82 which typically has a profile of a flattened cone which advantageously extends proud of the housing surface 62 when the lower end 74 is engaged with the base of the bore 66.

The dimensions of the piston 72 and particularly the hemi-spherical profile of the upper face 82 thereof typically complement the inner surfaces of the recess 70 of the top sub 14 so that the upper face 82 engages closely with the inner surface 80 of the top sub 14. Typically the upper face 82 and inner surface 80 are formed with chamfered edges. The arrangement is such that the piston 72 can be received in the recess 70 to rotationally lock the two components together at low torque loads, and to allow the transmission of relatively low torque loads between them. Thus the housing 58 and top sub 14 can be rotationally coupled at low loads. However, when relatively high torque loads are transmitted across the connection 15, the piston 72 can slide circumferentially out of the recess 70 to disconnect the two components from one another. The force connecting the two components together can be influenced by the selection of the mating profiles of the recesses 70 and the pistons 72, and by the force of the spring stack 56 that urges the housing 58 upwards against the top sub 14.

When the piston 72 is located in the recess 70 the device 10 is in an engaged configuration and the housing 58, bottom sub 26 and top sub 14 rotate together at low torque. As torque is increased from the top sub 14 to the bottom sub 26, it is transferred through the connection 15 until a threshold torque value is reached at which the torsional force being transmitted through the connection 15 is higher than the force applied to the housing 58 from the spring stack 56. At this point, the force applied by the spring stack 56 is insufficient to maintain the connection 15, and the piston 72 slides circumferentially out of the recess 70 thereby disengaging the connection 15 before the high torque loads transmitted through it damage the string below the connection 15. When the pistons 72 are not engaged in the recesses and no torque is being transmitted across the connection 15 the device is in a disengaged configuration. Continued relative rotation at high torque moves the pistons around the lower surface 68 of the top sub 14, without re-engaging the transmission. However, if the torque applied from the top sub 14 to the bottom sub 26 decreases below the threshold torque value determined by the shape of the pistons and the force of the spring stack 56, then the device 10 can itself move back to the engaged configuration by locating the piston 72 in a recess 70 on it's path around the surface 68, thereby allowing the transmission of lower torque without having to reset the device 10.

Each piston 72 is biased axially so that it will tend to stay engaged in a recess 70 when aligned with one. The bias comes from the disc springs 56 which act on an internal surface 84 of the housing 58 directly behind the bores 66. To prevent any build-up of pressure between the pistons 72 and the recesses 66, each recess 66 has a port 86 drilled through its base 88 to the surface 84. The disc springs 56 are therefore selected to provide a load upon the pistons 72 such that each piston 72 will remain seated in the recess 70 until a torque is applied which is greater than the load applied by the springs 56, at which point the pistons 72 will slide from the recesses 70 and the connection 15 will disengage.

In order that the pistons 72 and housing 58 do not rotate with the top sub 14 when disengaged, the housing 58 is typically rotationally fixed to the bottom sub 26, typically by rods 90 best shown in FIGS. 6 and 3. The upper end 28 of the bottom sub 26 has a reduced diameter neck 92 over which the housing 58 can slide. Typically the circumferential outer surface of the housing 58 has the same diameter as the outer surface 36 of the bottom sub 26. Arranged circumferentially around the outer surface of the neck 92 are axially extending elongate grooves 94a-f of semi-cylindrical cross-section. Axially extending elongate grooves 96a-f typically of matching semi-cylindrical cross-section are milled on an inner surface 98 of the housing 58 at the lower end 100. The grooves 94 and 96 align when the housing 58 is assembled and cooperate to retain the rods 90 between them, typically while allowing the bottom sub 26 and housing 58 to move axially relative to each other under the force of the springs 56.

The device 10 is typically assembled by locating the disc springs 56 within the housing 58 and inserting the pistons 72 into the bores 66 on the top of the housing 58, which is then slid onto the neck 92 at the upper end 28 of the bottom sub 26, with the rods 90 retained between the grooves 94, 96. The lower face 68 on the base of the top sub 14 is then pressed against the upper face 62 of the housing 58 so that the pistons 72 align with the recesses 70 and engage within them The bearing ring 34 is located at the ledge 32 of the bottom sub 26. The sleeve 20 is then slid over the bottom sub 26 and affixed to the top sub 14 by engaging the screw threads at the lower end 18 of the top sub 14 and the upper end 102 of the sleeve 20. The bearing ring 34 is positioned to allow a small amount of axial movement between the ledges 30,32 to take up the compression and expansion in the disc springs 56. The bearing ring 40 is located against the bottom end 48 of sleeve 20 over the bottom sub 14 and then crossover 44 is screwed onto the pin section 30 of the bottom sub 26. When assembled the device 10 provides a substantially cylindrical body with standard box section 16 and pin section 104 fittings for connection to other tools or tubulars in a string.

In use, the device 10 is mounted in a string using the box 16 and pin 104 sections. The pistons 72 are biased into the recesses 70 by the springs 56 and the device 10 is in the engaged configuration. Rotation of the top sub by low torque loads 14 will rotate the sleeve 20 rotationally fixed thereto and torque is transmitted through the rods 90 to drive rotation of the bottom sub 26 and crossover 44. The device 10 will thus rotate uniformly along its entire length at low torque values.

At higher torque values, such as might occur if the string below the crossover 44 experiences high drag through rotation in a dense fluid, the torque will eventually increase to a threshold torque value that disengages the connection device 15. Below the threshold torque value, the top and bottom subs 14, 26 will rotate together and transmit torque through the tool as described above. However, once the torque transmitted through the connection device 15 rises above the threshold torque value, the force from the springs 56 keeping the pistons 72 engaged with the recesses 70 is overcome by the torque transmitted through the connection 15, and the pistons 72 disengage from the recesses 70, thereby disengaging the connection 15. The pistons 72 are forced downwards against the bias of the springs 56, disengaging from the recesses 70 and slide circumferentially around the surface 68. The axial distance between the ledges 30,32 will reduce accordingly. In this disengaged configuration, the bottom sub 26 and crossover 44 rotate relative to the top sub 14 and sleeve 20 on bearing 34, and no torque is transmitted across the connection device 15.

When torque applied to the upper sub 14 is reduced, or when drag experienced by the lower string is reduced, the force applied to the pistons 72 by the springs 56 is eventually able to re-engage the pistons 72 with the recesses 70 and reconnect the top and bottom subs 14, 26, to transmit torque across the connection 15 once more. Also, when the speed of rotation of the two subs 14, 26 approach one another, for example, by slowing of the upper sub 14, the pistons 72 will move across the surface 68 and relocate in the recesses 70 by virtue of the spring bias. The device 10 is then engaged again. It will be apparent that the device 10 can be switched multiple times between configurations within the well bore.

Reference is now made to FIG. 7 which illustrates a tool string, generally indicated by reference numeral 110, within a well bore 112 for the purpose of cleaning a liner top 114, according to an embodiment of the present invention. Like parts to those in the earlier Figures will be given the same reference numeral to aid interpretation.

As described above the torque limiting device 10 is assembled and connected in a tool string 110. There will be a portion of tool string 128 above the device 10 and a portion of tool string 130 below the device 10. Directly above the device 10 there is typically located a circulation tool 116.

Circulation tools 116 are well known in the art and principally comprise a set of ports 118 which can be opened to provide fluid communication from the central bore 64 to an annulus 120 between the string 110 and a casing 122 or liner within the well bore 112. While a circulation tool 116 is used in this embodiment it will be apparent that other clean-up features can be provided in the tool 116. For example a filter tool 116 can be used which would trap debris during the cleaning method.

The tool string 110 is typically run into the well bore 112 while the string is rotated and mud is circulated. The mud is pumped down the central bore to an end (not shown) of the string 110, whereupon it exits the string 110 and is forced up the annulus 124, 120 to the surface (not shown) of the well bore 112.

The tool string 110 is run to a depth where the circulation tool 116 is positioned at the liner top 114. The liner top 114 is found at the top of a liner 126 which has been hung from an upper casing 122 or liner. The tool string 110 may have been used for other operations within the well bore 112 and then be repositioned at the desired position when cleaning is required. Alternatively a dedicated intervention run may be made for the purpose of clean-up. During movement of the string 110, rotation is maintained and the device 10 is in the engaged configuration so that the rotation is transmitted down the entire string 110 through the tool 10.

The clean-up process is begun by pumping a cleaning fluid, typically brine, down the central bore 64 from the surface. The brine displaces the mud within the bore 64 and the interface between the two will move down the central bore 64, exit the string, and move up the annulus 124 between the string 130 and the liner 126. Rotation of the string 110 is maintained through this process, and as the torque is typically below the disconnection threshold, the connection 15 remains engaged and the string 110 rotates as a whole.

When the interface reaches the liner top 114, a change in pressure is seen at the surface brine pumps as the brine enters the now wider annulus 120 between the string 128 and the casing 122. The weight of mud may be sufficiently heavy to counter the pumping pressure from the brine. In order to assist the process, the ports 118 on the circulation tool 116 are typically opened. Brine can then pass from the central bore 64 to the annulus 120 at the liner top 114, mix with the existing brine behind the interface and the additional pressure provided, as the pump does not have to move the brine in the bore 64 below the liner top 114 or in the annulus 124, thus the interface moves up the annulus 120 to the surface. In this way, the entire wellbore 112 is flushed with brine and any debris, particles or mud will have been swept from the annulus 120,124 to leave a clean well. In particular as the brine from the ports mixes with brine behind the interface at the liner top 114, the liner top 114 is also flushed with brine to ensure it is cleaned.

This is in contrast to prior art techniques which stop rotation of the string 110 before the interface has reached the liner top 114. Pumping of brine from the ports 118 will then leave a column of mud between the port 118 position and the interface, at the liner top 114, which will provide inefficient cleaning. This procedure is used because maximum torque will be applied to the string 110 at the point where the interface reaches the wider annulus 120 and the ports 118 are opened. Such torque would damage the string 110 as it is rotated.

By using the device 10 of the present invention, the disc springs 56 can be set to disengage the device 10 when the torque applied reaches a set threshold, typically reached as the brine mud interface approaches the liner top 114. The string 128 above the device 10, including the circulation tool 116 and the top sub 14 and sleeve 20 of the device 10, can then be rotated at a constant rate and torque from the top drive on the rig, as fluid is pumped into the annulus 120 at the liner top 114. The torque applied to the string 110 by the top drive can be fairly high without risks of torsional damage to the string 110 or its components, because as the torque threshold is reached as a result of the upward movement of the mud-brine interface in the lower annulus 124, and the drag of the lower string 130 increases to the point where the torque applied across the device 10 rises above the disconnection threshold, then the connection 15 will disengage allowing the bottom sub 16, crossover 44 and remainder of the string 130 below the device 10 to remain stationary and so prevent damage to the string 110 or the crossover. Typically if the connection device 15 disengages, the disconnection will be evident to the operator by a pressure spike in the surface brine pumps and in the event that continued rotation of the lower string 130 is desired, for example, when the connection 15 disengages before the mud-brine interface has reached the liner top 114, then the torque applied by the top drive can be reduced slightly to slow the rotation of the upper string and to allow the connection device 15 to re-engage as previously described so that the entire string 110 rotates as a whole. Optionally the disengagement of the connection 15 can be signalled to the surface by other ways, for example by signal lines.

The disc springs 56 are typically chosen to compress at a calculated expected maximum torque at the point where the mud-brine interface reaches the casing 120, but the device 10 also provides a safety feature in that, if the string 130 sticks at any point below the device 10, torque above the threshold will be transmitted to the device 10 and consequently the device 10 will disengage, so preventing any damage to the string 110, by stopping rotation of the string 130 relative to the string 128. If the obstruction is cleared, say by increased pumping, the device 10 can be reengaged to provide through tubing rotation in the entire tool string 110 again.

A principal advantage of the present invention is that it provides a torque limiting tool which can be re-set between an engaged and disengaged configuration any number of times within a well bore.

A further advantage of the present invention is that it provides a method of cleaning a liner top which is more efficient than the prior art techniques, by allowing cleaning fluid to reach a liner top prior to jetting cleaning fluid at the liner top.

Figure 8:
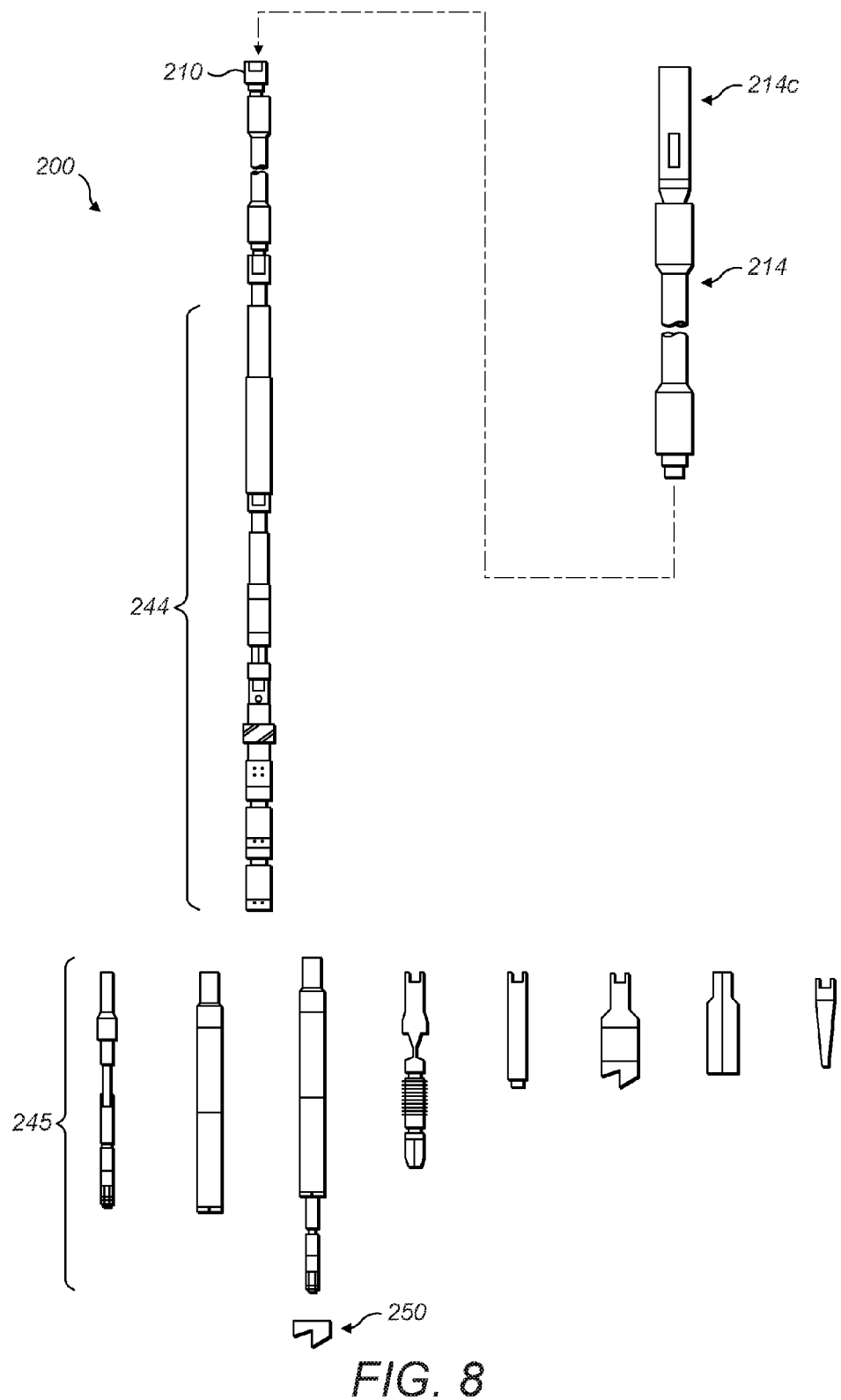
FIG. 8 shows a further example of a torque limiting device used in a fishing string.

Referring now to FIG. 8, a further embodiment is shown in the form of a fishing string 200 incorporating a torque limiting device generally indicated by reference numeral 210. Above the torque limiting device 210 there is located a top string 214 typically composed of drill pipe connecting to the upper end of the torque limiting device 210. The torque limiting device can be essentially as described in the previous embodiments, and the fishing string 200 can optionally incorporate a circulation sub 214c above the torque limiting device 210, within the string of drill pipe.

Below the torque limiting device 210 the fishing string 200 can have a variety of known fishing tools such as mills, e.g. packer mills, wash pipes, spears, screw in subs, overshots and tapping tools, and other fishing tools including any combination of more than one of these. Typically the tools are operated by rotation of the string 200 from the top drive on the rig.

Between the fishing tools and the torque limiting sub the fishing string 200 can optionally have one or more known jarring tools, bumper subs, intensifiers and/or stabilisers, or combinations of the same. Optionally the jarring and bumper tools could be provided above the torque limiting device 210. Elsewhere in the string 200 recovery subs such as boot baskets etc can be provided to retain and recover large pieces of debris generated during the fishing and milling operations.

Thus the torque limiting device can be incorporated into a fishing string, typically having a circulating device above the torque limiting device 210 and a string of fishing tools 244 below it. Typically the torque limiting device 210 could be positioned at the lower end of the upper string of drill pipe having a relatively high resistance to torque, typically a higher torque resistance than the fishing string below the torque limiting device 210. Positioning the torque limiting device 210 at the top of the lower string has the advantage that the device 210 protects all the connections in the lower string, so that if the torque values applied through the connection between the upper string 214 and the lower string 244 were to momentarily exceed the limits of the lower string 244 then the torque limiting device would disengage to avoid transferring the high torque values above it to the weaker fishing string below it. For example some fishing tools are very fragile having very low capacity to resist torque. Wash pipe for example typically has a very thin wall to fit between the inner surface of the casing and the outer surface of the fish. It therefore has a lower capacity to resist torque than the drill pipe in the upper string 214.

Fishing operations are typically carried out in sections of casing or open hole. The fishing string 200 incorporating the torque limiting device 210 is typically run into the wellbore to try to recover a stuck fish 250. In some cases, the fish 250 is stuck below a casing or liner joint having a step in the internal diameter at the top of the liner.

In this example, the fishing string 200 is made up at the surface incorporating the torque limiting device and the fishing tools below it and is run into the well. The torque limiting tool 210 is typically installed at the very uppermost end of the lower and weaker string 244 so that the top end of the torque limiting tool 210 typically connects directly onto the upper string of larger diameter drill pipe 214 or similar. There should typically be no "skinny" pipe components above the torque limiting tool. The upper string 214 above the torque limiting device 210 can typically have a circulation tool 214c or similar and may incorporate casing cleaning tools adapted to clean the casing above the liner. These are typically made up to the top connection of the torque limiting tool and run into the well as the string 200 is being made up. The upper string 214 is then made up using typically 5" drill pipe and the whole assembly is run into the hole to the required depth.

The fishing tools in the lower string 244 below the torque limiting device 210 are then operated from surface in conventional ways to catch and recover the fish.

During the fishing operation the string is rotated from the surface drive to operate the tools in the lower string 244. The torque limiting device 210 typically operates passively to de-couple the upper 214 and lower 244 strings from one another when the torque passing through the tool 210 exceeds the preset value thus disengaging the lower string 244 from the upper 214. The torque limiting device 210 typically re-engages once the torque levels in the string 200 drop below the limit. Typically the limit is set to de-couple the string at a threshold below the upper limit of the lower "skinny" string 244 so that no torque is transmitted to the lower string 244 above the threshold that it can bear.

During fishing operations the total torque reading for the complete string can be monitored from the surface and plotted to identify sudden drops in torque which would indicate likely de-coupling of the tool and relative rotation of the upper 214 and lower 244 strings.

Figure 9:
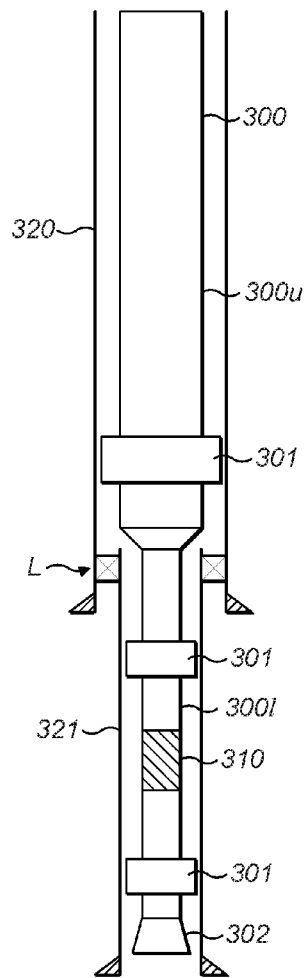
FIGS. 9 and 10 show a schematic view of further examples of a torque limiting device used in a cleaning and/or scraping string.
Figure 10:
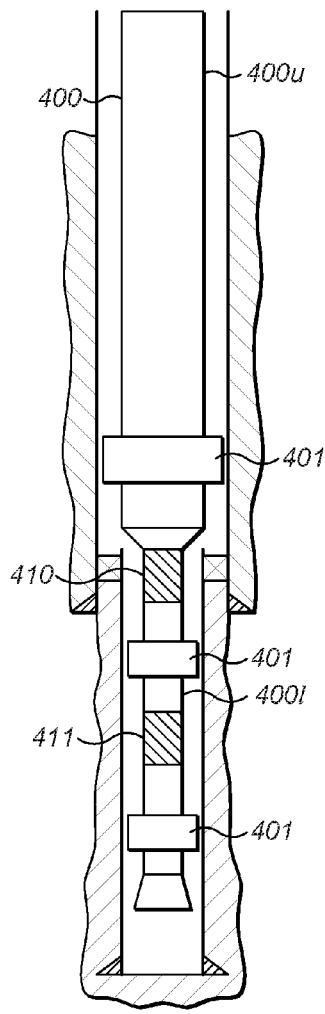

A further two examples of a torque limiting tool incorporated in a cleaning string are shown in FIGS. 9 and 10. In earlier embodiments, the torque limiting tool is typically placed at or near to a junction in the string between larger diameter and smaller diameter parts of the string, and in particular, desired locations for the torque limiting device in earlier embodiments have been at or near the top of the smaller diameter string. Positioning the torque limiting device at this location is desirable in the earlier embodiments in order to protect the lower, smaller diameter string below the torque limiting device. A typical example might involve a step in the inner diameter of the casing from, e.g. 9.625" casing down to 7" liner. Typically wellbore cleaning operations performed at such sites use a work string having cleaning and/or scraping tools mounted on 5" drill pipe (DP) with NC50 connections in the 9.625" casing and 3.5" DP with NC38 connections in the 7" liner. Hence there is a step in the diameter of the cleaning string, and the lower string of 3.5" DP has less torsional capacity before a failure threshold than the larger diameter section of 5" DP. In such cases, according to earlier examples of the invention, it was desirable to located the torque limiting tool at the very top of the 3.5" DP, typically at the transition between the larger 5" and the smaller 3.5" diameters of DP, in order to protect the lower capacity 3.5" string by dislocating the two sizes of DP from one another at the junction in the event that the torque in the cleaning string as a whole exceeded the torsional capacity of the lower 3.5" string. In the embodiments of the invention described in FIGS. 9 and 10, the torque limiting device is not necessarily placed at or near to the transition between the different diameters. It has been found by the inventors that positioning the torque limiting tool at other locations, e.g. mid-string, so that part of the 3.5" section of DP is below the torque limiting device, and part is above it, is also effective in combating the tendency of the string to fail if the torque exceeds the torsional capacity of the lower section of 3.5" DP.

FIG. 9 shows schematically the downhole end of a 5000 foot liner 320 in which a work string 300 is operational with cleaning, brushing, and/or scraping tools 301 located above a drill bit or mill 302. A torque limiting device 310 is located mid-way down the lower section of 3.5" DP 300*l*, spaced away from the interconnection with the upper section of 5" DP 300*u*. Torque calculations based on design data models indicate that when the low viscosity drilling mud surrounding the lower section 300*l* of 3.5" DP is displaced with brine (as normally happens during cleaning operations) the torque at the top of the 3.5" DP section 300*l* will exceed the desired torque value of that section 300*l*, and there will be a higher than normal risk of torsional damage (twisting off) at the inter-connection between the two sections 300*u*, 300*l* of DP.

In the FIG. 9 embodiment, the torque limiting tool 310 is located at a mid-way position in the 3.5" section of DP 300*l*, and is spaced away from the step in the diameters between the upper and lower sections of DP. The torque limiting tool of the FIG. 9 embodiment is set to dislocate at a value less than the maximum capacity of the lower section of 3.5" DP. Tests performed by the inventors indicate that the FIG. 9 arrangement with the torque limiting tool located in the lower section 300*l*, spaced away from the transition between the two different diameters, is equally effective at protecting the entire 3.5" string 300*l* against torsional stresses exceeding its capacity.

This embodiment also has the added advantage that the upper part of the 3.5" DP 300*l* above the torque limiting device 310 (which is rigidly connected to the upper 5" string) continues to rotate with the upper section of the 5" DP 300*u*, thereby maintaining pipe movement in the upper part of the 3.5" section 300*l* and enhancing the cleaning action and agitation of the fluids at the liner top L in the same area, even when the torque limiting device has disengaged due to a kick or unexpected spike in the torque on the lower section 300*l*. This is a surprising advantage, as it resists settling of particulates on the shelf of the liner top L even while the bottom part of the lower section 300*l* has been disengaged and is not rotating with the upper section 300*u*.

FIG. 10 shows a work string 400 in a similar arrangement having upper and lower parts 400u and 400l, located in similar diameters of casing and having scraper, brush or other cleaning tools 401. The work string 400 is provided with first 410 and second 411 torque limiting devices located in the lower section of DP 400l, and typically arranged to disengage at different thresholds. Typically the upper device 410 can be set to disengage at a higher threshold than the lower device 411.

Optionally more than two torque limiting device can be incorporated into the string 400, for example 3, 4 or more torque limiting devices can be incorporated into the string 400. Typically the torque limiting devices can be spaced apart from one another in the string as shown in FIG. 10, but in other embodiments the torque limiting devices can be grouped together, in a single cluster having 2 or more torque limiting devices (e.g. 2, 3, 4 or more adjacent devices per cluster) or in 2 or more clusters that are spaced apart from one another along the string 400. Optionally the torque limiting devices 410, 411 (and others if present) can be set to disengage (and thereby allow relative rotation between the string above and below each respective torque limiting devices) at different thresholds of torque. Thus the torque limiting devices 410, 411 set at different parts of the string 400 can be set to disengage at different torque thresholds, so that as the torque experienced by the string increases, different section of the string disengage in a safe manner, at different times corresponding to particular threshold torque values of the devices 410, 411.

In some modified embodiments of the FIG. 10 arrangement, optionally the torque limiting devices 410, 411 set at different parts of the string 400 can be set to disengage at the same torque threshold, so that once that threshold is reached, spaced apart sections of the string disengage at the same time.

Thus, when using more than one torque limiting device, as in the FIG. 10 embodiment, the threshold torque limits for each device 410, 411 may be set to different values or to the same or similar values.

In the FIG. 10 embodiment, the devices 410, 411 can be the same or different. For example, in the FIG. 10 embodiment, the first torque limiting device 410 is typically provided in accordance with the first embodiment, and is configured to rotationally disengage the two parts of the string 400 on either side of the device 410 at a particular torque threshold and can automatically re-engage the two parts and permit the transfer of torque across the connection when the torque level drops back down below the threshold torque value. The second torque limiting device 411 can optionally be a different design of a "one-shot" torque limiting device that is not re-engagable, and in which, after the torque threshold has been reached and the device 411 has disengaged the two parts of the string, the device 411 cannot automatically reset in situ, so that when the torque level through the connection across the second device 411 drops back below the threshold torque value, the device 411 remains disengaged, preventing the transfer of torque across the connection, and typically requiring intervention to re-set the one-shot device 411. Further variants of this embodiment can have 1, 2, 3, 4 or more of each kind of one-shot and re-engageable torque limiting device, optionally spaced apart from one another in the string, and each can be set to the same or similar or different torque thresholds. The one-shot device(s) can be above or below the re-engagable devices in the string 400.

Accordingly, FIGS. 9 and 10 show how it is not necessary to disconnect the entire 3.5" string at the transition point and disconnecting a proportion of the string is equally effective at preventing excessive torque in the 3.5" DP.

Modifications may be made to the invention herein described without departing from the scope thereof. For example any number of pistons can be selected. The profile on the top of each piston and the mating recess can be varied, for example, a part spherical profile could be used and indeed a ball could be mounted at the end of the piston to achieve this. While disc springs have been described any resilient member capable of expansion and contraction may be used such as elastomers, or other spring types, to bias the pistons.

Figure 13:
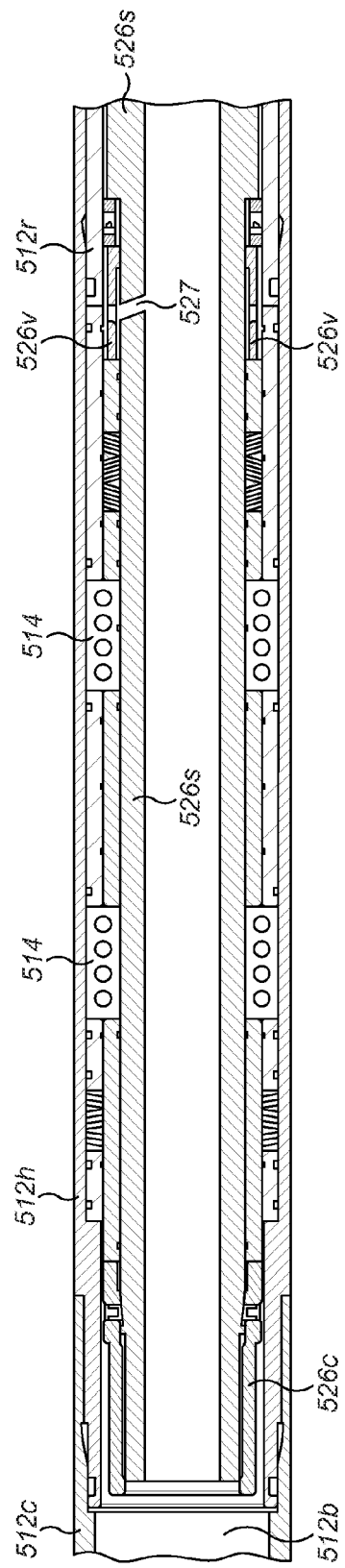

FIGS. 11-13 of the drawings illustrates a torque limiting device suitable for incorporating into a work string, and generally indicated by reference numeral 510, according to a further embodiment of the present invention. The upper end of the device 510 closest to the surface is shown on the left hand side of the drawing, and the lower end of the device closest to the bottom of the hole is shown on the right hand side of the drawings. The device 510 has an upper portion 512 with a box connection for incorporation into the string, and a lower portion 526 having a pin connection, for connecting the device 510 into the work string. The upper portion comprises an upper collar 512c and a housing 512h connected via screw threads below a downwardly facing shoulder 512s in the collar 512c. The housing 512h has a bore 512b that receives a shaft 524s of the lower portion 526. Below the housing 512h the upper portion has a spring sub 512r, and a key housing 513 attached non-rotatably via screw threads to the spring sub 512r. The bore 512b extends coaxially through all of the components of the upper portion 512.

The lower portion 526 is radially spaced from the inner wall of the bore 512b by bearings 514. Two races of bearings 514 are shown in the example described, which typically contain balls, but rollers or other designs of bearings can be used, and more or less than two races can be provided, e.g. 3, 4, 5 or some other number, in order to centralise the shaft 526s within the bore 512b, and to reduce the friction during relative rotation of the shaft 526s within the bore 512b.

The bearings 514 are typically axially spaced in the device 510 by spacer sleeves extending radially between the inner surface of the housing 512h and the outer surface of the shaft 526s. The spacer sleeves are arranged in radially outer and inner concentric pairs, and typically incorporate seals such as o-rings that seal between the outer spacer sleeves and the inner surface of the bore 512b, and between the inner spacer sleeves and the outer surface of the shaft 512s, leaving a fluid pathway between radially adjacent sleeves. Optionally resilient devices such as Belleville spring stacks can be incorporated between axially adjacent pairs of spacer sleeves, thereby applying compressive force to the outer and inner sleeves. The number of spring stacks, and the nature of the resilient device, can be modified within the scope of the invention.

The radially outer sleeves are compressed between a downwardly facing shoulder in the housing 512h and an upwardly facing end of the spring sub 512r that is screwed into the end of the housing 512h, between the housing 512h and the key housing sub 513.

The radially inner sleeves are compressed between the lower end of a cap nut 526c screwed onto the upper end of the shaft 512s, and an upwardly facing shoulder on the outer surface of the shaft 512s, which can be optionally provided by the upper end of a vent sleeve 526v that can be screwed onto the shaft 512s.

When assembled with the cap nut 526*c* and the spring sub 512*r* tightened up, the outer and inner sleeves are compressed and the spring stacks compress the bearings 514. The spring stacks can be preloaded with different amounts of force, typically around 15,000 pounds, which is typically about 40-60% of their compressive limit, so that axial impacts sustained in use below that threshold will not affect the stacks, but above the threshold, the stacks will typically compress further, protecting the bearings against damage. The threshold can be varied in accordance with the desired operating parameters.

The vent sub 526*v* typically has a radial vent to permit fluid to pass between the bore 526*b* of the shaft 526*s* and the outside of the shaft 526*s*. Fluids flowing through the device can typically pass into the annular area between the shaft 526*s* and the housing 512*h* at the upper end of the shaft 526*s*, and this is beneficial as it lubricates the bearings 514. The seals on the spacer sleeves typically route the fluid flowing down the annular area in to the annulus between the inner and the outer sleeves, to direct the fluids towards the bearings and restrict fluid flow elsewhere, thereby reducing erosion. The fluids can flow out of the annular area through the radial vent in the vent sub 526*v*, back into the bore 526*b*.

The lower portion 526 is typically axially constrained within the bore 512*b* of the housing which is rotationally fixed to the upper portion 512 by means of the screw thread. The upper portion 512 and lower portion 526 are rotationally connected together by a torque limiting connection 515 operating between them. The torque limiting connection is provided by a frangible element housed in the key housing shown best in FIG. 12.

The key housing 513 is rotationally connected to the upper portion 512 by the screw thread connection. The bore of the key housing 513 receives the shaft 526*s* of the lower portion 526. Rotation of the lower portion 526 within the key housing 513 is restricted by a key 535 extending between the radially opposing inner surface of the key housing 513, which is rotationally fixed to the upper part of the string, and the outer surface of the shaft 526*s*, which is rotationally fixed to the lower part of the string and is rotatable relative to the top sub at high torque loads that dislocate the connection 515.

Optionally the connection 515 comprises a key 535 which in this embodiment can comprise a flat plate which can be held in opposing grooves in the inner surface of the key housing 513 and the outer surface of the shaft 526*s*. Optionally the plate can be attached to one of the components, or both of them, or neither. The plate can typically be composed of brass or some other metal that has a lower capacity to resist torsional forces than the shaft or the key housing, so that it sacrificially breaks in preference to the other components. The lower capacity for torsional resistance can be engineered as a result of weaker material, weakened fracture points in the plate, or a combination of these and other factors. The threshold at which the plate breaks can be determined by selecting the material, length, thickness, structure, and/or other characteristics of the plate. Also, although one plate is shown in the sectional view of FIG. 12, more than one plate could be arranged either axially or circumferentially spaced away from the plate shown in the drawings, thereby increasing the threshold of the failure of the connection 515. The key 535 can comprise a pin, plate, or some other component.

Once the threshold is reached and the key is damaged, the lower portion is free to rotate within the bore of the upper portion. The connection 515 is made up by withdrawing the tool to surface and installing another intact key 535.

The torque limiting device 510 of FIGS. 11-13 can typically be incorporated into a cleaning or other work string, optionally having a circulating device above the torque limiting device 510 and a cleaning tool optionally below it. Typically the torque limiting device 510 could be positioned at the lower end of an upper string of drill pipe having a relatively high resistance to torque, typically higher than the cleaning string below the device 510. If the torque values applied through the connection between the upper string and the lower string were to momentarily exceed the limits of the lower string then the torque limiting device would disengage to avoid transferring the high torque values above it to the weaker cleaning string below it. However, it is possible to place the device 510 at another location in the string as described in earlier embodiments.

The string can be made up as described in earlier embodiments, which can optionally incorporate other torque limiting device as described herein. According the string can optionally contain only the torque limiting device 510, or only another torque limiting device described here, or one of each, or more than one of each. Different devices can be set to disconnect at different thresholds in the string.

During a typical cleaning operation the torque limiting device 510 typically operates passively to de-couple the upper and lower strings from one another when the torque passing through the tool exceeds the preset value thus disengaging the part of the string below the device 510. Typically the limit is set to de-couple the string at a threshold torque value below the capacity of the lower string so that no torque is transmitted to the lower string above the threshold torque value that it can bear.

During cleaning operations the total torque reading for the complete string can be monitored from the surface and plotted to identify sudden drops in torque which would indicate likely de-coupling of the tool and relative rotation of the upper and lower strings.

At higher torque values, the torque will eventually increase to a threshold that disengages the connection device 515. Below the threshold, the upper and lower portions 512, 526 will rotate together and transmit torque through the tool as described above. However, once the torque transmitted through the connection device 515 rises above the threshold torque value, the key 535 is broken by the torque transmitted through the connection 515, and no torque is transmitted across the device 510.

While the foregoing is directed to embodiments of the present invention, other and further embodiments of the invention may be devised without departing from the basic scope thereof, and the scope thereof is determined by the claims that follow.

The invention claimed is:

1. A method of treating a liner portion located in a casing in a well bore, comprising the steps:
    locating a first torque limiting device in a tool string;
    running the tool string in the well bore while rotating the tool string and the first torque limiting device;
    circulating a fluid through the tool string and up an annulus between the tool string and a liner to the liner portion to be treated;
    applying torque to the tool string and allowing the first torque limiting device to disengage at a first threshold torque value;
    actuating a selectively actuable circulation port in the tool string adjacent to and above the torque limiting device;
    circulating fluid from within the tool string through the selectively actuable circulation port into the annulus between the tool string and the casing to flush the annulus with fluid from the port;

wherein the first torque limiting device is arranged to disengage when the applied torque reaches the first threshold torque value, and including the step of automatically re-engaging the first torque limiting device after the applied torque drops below the first threshold torque value.

2. The method of claim 1, wherein the tool string includes a circulation tool located in the region of the liner to be treated, wherein the circulation tool has a port passing through a wall of the work string, and wherein the method includes opening the port in the circulation tool to pass fluids from a bore of the tool string through the port and into the annulus between the tool string and the liner.

3. The method of claim 1, wherein the tool string comprises a second torque limiting device, and wherein the first and second torque limiting devices are spaced apart along the tool string, and wherein the method includes allowing the second torque limiting device to disengage under the applied torque at a second threshold torque value that is different from the first threshold torque value.

4. The method of claim 3, wherein the second torque limiting device is configured to stay in that disengaged configuration, without re-engaging after the torque drops below the second threshold torque value.

5. The method of claim 3, wherein the first torque limiting device is disposed above the second torque limiting device in the tool string, and wherein the first threshold torque value is greater than the second threshold torque value.

6. The method of claim 3, wherein at least one of the first and second torque limiting devices is arranged to disengage when the applied torque reaches the lower of the first and second threshold values, and wherein after disengaging, the said at least one of the first and second torque limiting devices is arranged to stay in a disengaged configuration, without re-engaging after the torque drops below the said lower of the first and second threshold values.

7. A torque limiting apparatus for a tool string of an oil or gas well, the torque limiting device comprising:

a body having an axial bore therethrough for fluid flow, wherein the body comprises:
  a first member and a second member interconnected to be relatively rotatable; and
  a first torque limiting device adapted to transfer torque between the first and second members up to a first threshold torque value, thereby rotationally coupling the first and second members together at torque levels below the threshold torque value, wherein the first and second members are interconnected by the first torque limiting device, wherein the first torque limiting device is adapted to disengage a connection between the first and second members when torque applied across the body is greater than the first threshold torque value, whereby after disengagement of the first torque limiting member at least a portion of the first member is rotatable relative to at least a portion of the second member, wherein the first member has a first surface having at least one recess thereupon; the second member has at least one movable protrusion, each protrusion being biased by a resilient device and being movably arranged in the second member such that the resilient device biases the protrusion into the recess on the first member to cause the first and second members to rotate together; and wherein the recess and the protrusion have slidably engageable surfaces such that when a torque applied across the body is greater than the first threshold torque value, the protrusion disengages from the recess and at least a portion of the first member is rotatable relative to at least a portion of the second member, and wherein the first and second members have a common axis, and each protrusion moves axially parallel to the common axis to engage and disengage with the recess.

8. The torque limiting apparatus of claim 7, wherein the first threshold torque value is adjustable by varying a preset load of the resilient device.

9. The torque limiting apparatus of claim 7, including more than one protrusion and recess, and wherein each protrusion has a cam surface adapted to engage and disengage axially from a recess when the first and second members rotate relative to each other.

10. The torque limiting apparatus of claim 7, wherein the first torque limiting device is configured to automatically re-engage to transfer torque across the connection between the first and second members when torque applied across the body drops below the first threshold torque value.

11. A work string assembly for use in an oil or gas well, comprising:

a work string having a first tubular and a second tubular, and at least first and second torque limiting devices connected within the work string, wherein the first and second torque limiting devices are spaced axially along the work string, and each of the first and second torque limiting devices comprises:
  a body having an axial bore therethrough for fluid flow, wherein the body comprises:
    a first member and a second member interconnected and adapted to transfer torque between the first and second members up to a threshold torque value, thereby rotationally coupling the first and second members together at torque levels below the threshold torque value, and wherein the torque limiting device is adapted to disengage the connection between the first and second members when torque applied across the body exceeds the threshold torque value, whereby after disengagement of the torque limiting member at least a portion of the first member can rotate relative to at least a portion of the second member, wherein the first torque limiting device is configured to disengage the connection between the first and second members of the first torque limiting device at a first threshold torque value, and wherein the second torque limiting device is configured to disengage the connection between the first and second members of the second torque limiting device at a second threshold torque value, and wherein one of the first and second threshold torque values are different and wherein one of said threshold torque values is lower than the other, and wherein one of the first and second torque limiting devices is arranged to disengage when the threshold torque value reaches said one of the threshold torque values, and wherein after disengaging, said one of the first and second torque limiting devices is arranged to stay in a disengaged configuration, without re-engaging after the torque drops below said lower of the first and second threshold values.

12. The work string of claim 11, wherein the first torque limiting device is disposed above the second torque limiting device in the work string, and wherein the first threshold torque value is greater than the second threshold torque value.

13. A method of operating a work string in a wellbore in an oil or gas well, where the wellbore has an upper portion and a lower portion, the method comprising:

inserting the work string assembly into the wellbore being treated, the work string assembly having upper and lower portions of the work string, and first and second torque limiting devices spaced apart along the string, each of the first and second torque limiting devices having first and second members connected together wherein the first torque limiting device is configured to transfer torque between the first and second member of the first torque limiting device below a first threshold torque value and to disengage the first and second member of the first torque limiting device when torque transferred across the first torque limiting device exceeds the first threshold torque value, and wherein the second torque limiting device is configured to transfer torque between the first and second member of the second torque limiting device below a second threshold torque value and to disengage the first and second member of the second torque limiting device when torque transferred across the second torque limiting device exceeds the second threshold torque value, whereby after disengagement of each torque limiting device at least a portion of the first member can rotate relative to at least a portion of the second member, wherein the first and second threshold torque values are different, and wherein at least one of the first and second torque limiting devices is arranged to disengage when the threshold torque value reaches a lower of the first and second threshold torque values, and wherein after disengaging, the said at least one of the first and second torque limiting devices is arranged to stay in a disengaged configuration, without re-engaging after the torque drops below the said lower of the first and second threshold values.

14. The method of claim 13, including maintaining the lower portion of the work string static in the well while rotating the upper portion of the work string relative to the well and the lower portion.

15. The method of claim 13, wherein the first and second members of each torque limiting device remain connected together when the torque limiting device is disengaged.

16. A work string for use in an oil or gas well, the work string having first and second string portions, and at least first and second torque limiting devices connected within the work string, wherein the first and second torque limiting devices are spaced axially along the work string, wherein the first and second torque limiting devices are adapted to transfer torque between the first and second string portions up to a threshold torque value, and wherein the first and second torque limiting devices are adapted to disengage when torque applied between the first and second string portions exceeds the threshold torque value, whereby after disengagement of the said at least one of the first and second torque limiting devices, at least a portion of the first string portion can rotate relative to at least a portion of the second string portion, wherein the first torque limiting device is configured to disengage at a first threshold torque value, and wherein the second torque limiting device is configured to disengage at a second threshold torque value, and wherein the first and second threshold torque values are different, and wherein at least one of the first and second torque limiting devices is arranged to disengage when the threshold torque value reaches a lower of the first and second threshold values, and wherein after disengaging, the said at least one of the first and second torque limiting devices is arranged to stay in a disengaged configuration, without re-engaging after the torque drops below the said lower of the first and second threshold values.

17. The work string of claim 16, wherein the first torque limiting device is disposed above the second torque limiting device in the work string, and wherein the first threshold torque value is greater than the second threshold torque value.

* * * * *